UNILATERAL CONDUCTIVE GATE CIRCUIT FOR SELECTIVE
ENERGIZATION OF ONE OF TWO LOAD DEVICES
Filed Dec. 14, 1964
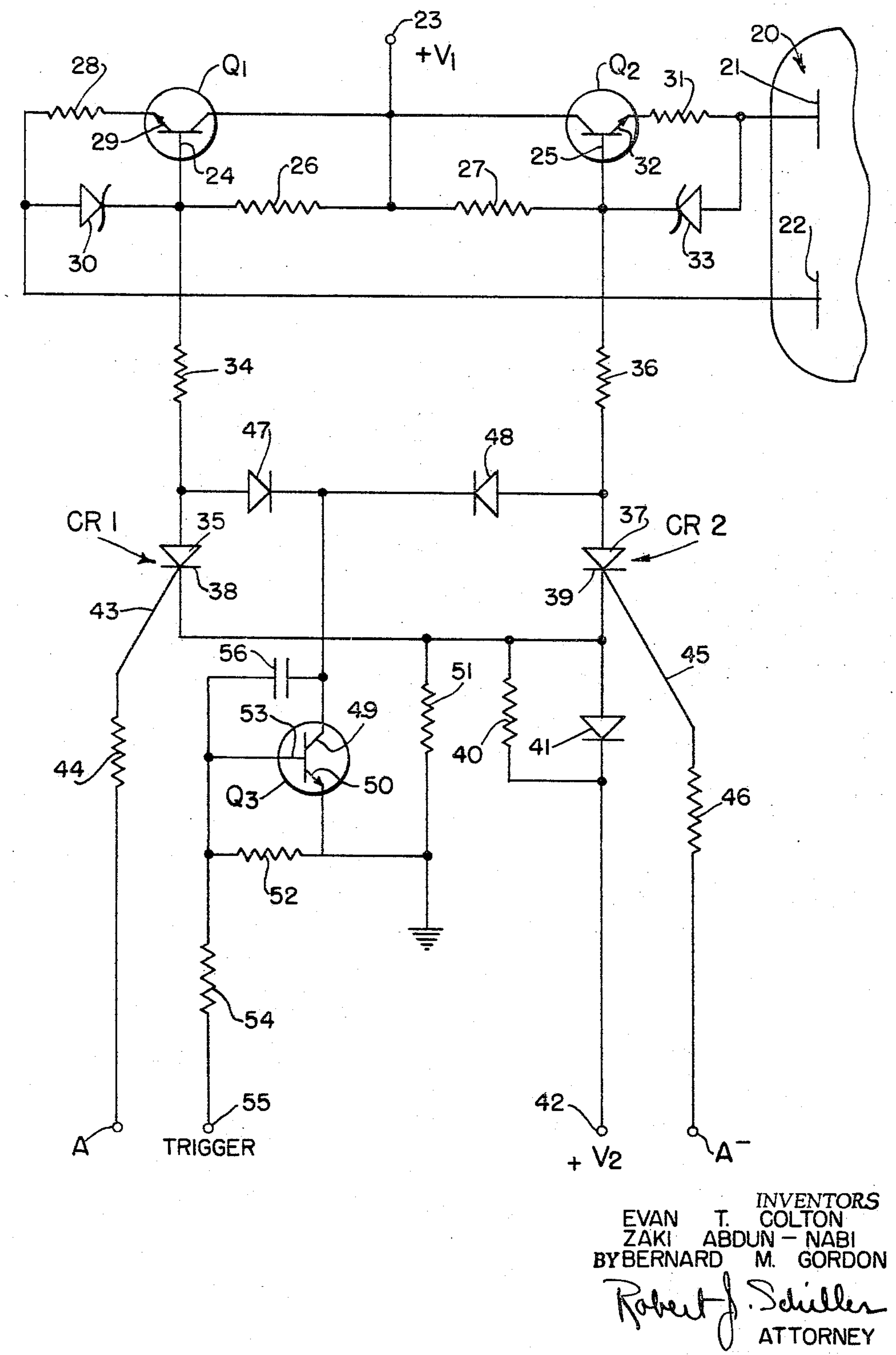
INVENTORS
EVAN T. COLTON
ZAKI ABDUN-NABI
BY BERNARD M. GORDON
Robert J. Schiller
ATTORNEY United States Patent Office 3,329,949

Patented July 4, 1967

3,329,949

UNILATERAL CONDUCTIVE GATE CIRCUIT FOR SELECTIVE ENERGIZATION OF ONE OF TWO LOAD DEVICES

Evan T. Colton, Lynnfield, Zaki Abdun-Nabi, Framingham, and Bernard M. Gordon, Magnolia, Mass., assignors, by mesne assignments, to Janus Control Corporation, Waltham, Mass., a corporation of Massachusetts Filed Dec. 14, 1964, Ser. No. 418,008

6 Claims. (Cl. 340—324)

This invention relates to digital electronic devices and more particularly to selective digital storage display circuits.

It is often desirable to display, on command, data representing the state of the output of a digital counter, and to retain or store the data until it is desired to observe a selected later output state. Devices providing this capability are known as latching storage displays, and are quite useful in such applications as digital voltmeters, sampling frequency meters, and the like.

In our copending application, Ser. No. 387,963, now Patent No. 3,292,036, filed Aug. 6, 1964, there is disclosed a latching storage display which incorporates controlled rectifiers for switching currents so as to activate and deactivate display elements. A charge storage means, such as a capacitor, is coupled to each controlled rectifier to provide a timed reverse-bias period which allows coded signals to selectively switch one of the rectifiers. However, as is well-known, capacitances tend to create switching transients which, under certain conditions, are considered undesirable.

A principal object of the present invention is therefore to provide a novel storage display circuit for converting a digital code and displaying the converted code on command, i.e. selectively.

Other objects of the present invention are to provide such a circuit whereby the converted code can be displayed or stored indefinitely in a read-out device; to provide such a circuit wherein the input code can be changed or withdrawn during storage of a converted code without deterioration or change in the storage function; to provide such a circuit wherein only a single input pulse is required to accomplish erasure or removal of the displayed code, decoding of the then existing state of the input code, and display of the newly converted or decoded code.

Another important object of the present invention is to provide a circuit of the type described in which the read-out device is controlled by gated current conductive means. Yet other objects of the present invention are to provide such a circuit having a response to an input pulse such that the leading edge of the latter causes the operating potential of a display device to fall to an inoperative level and eliminate the displayed code, and the trailing edge of the pulse restores the potential to an operative level and permits a converted input code to be displayed; and to provide such a circuit adapted to accept the input code as gating signals which are operative to affect the display of a storage device only after a command pulse has been received.

Other objects of the invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims.

For a fuller understanding of the nature and objects of the present invention, reference should be had to the following detailed description taken in connection with the accompanying drawing wherein there is shown a schematic circuit diagram of an exemplary portion of a digital storage display circuit embodying the principles of the present invention.

Referring now to the drawing there will be seen application of the principles of the present invention to provide a portion of a decoding and storage circuit. The embodiment shown is particularly adapted for converting a binary coded decimal type of output and providing a decimal display thereof. As a read-out device or means for providing such display there is shown schematically, in fragment, biquinary numerical indicator tube 20, such as the cold-cathode gas-filled tube sold under the trade designation of ZM1030 Bi-Qui by Amperex Electronic Corporation of Hicksville, New York. It will be appreciated that the principles of the present invention are applicable to other means for displaying other codes and in other forms such as alphanumeric. Tube 20 comprises five pairs of tied cathodes, (not shown) each pair being identified by the decimal numeral display associated therewith, and a pair of anodes 21 and 22.

Means for converting a code (such as the output of a binary-coded decimal counter having four, cascaded, bistable stages operating in an 8–4–2–1 counting mode) and for driving tube 20 in accordance with the conversion includes, as a portion thereof, the circuit shown which constitutes therefore means for selecting the odd or even state of tube 20. A number of devices for selecting one of the five cathode pairs of tube 20 in accordance, for example, with the output of the aforesaid decimal counter are known in the art and are therefore neither shown nor described here.

Means are included for providing a substantially constant magnitude current flow to the biquinary tube and comprises first and second switching transistors $Q_1$ and $Q_2$. The collectors of the transistors are tied to one another and to terminal 23 which is intended to be connected to a source of DC supply voltage $+V_1$ (e.g. about 200 volts) for tube 30. Base 24 of transistor $Q_1$ and base 25 of transistor $Q_2$ are respectively connected through resistors 26 and 27 to the tied collectors. Anode 22 of tube 20 is connected through resistor 28 to emitter 29 of transistor $Q_1$ and is also connected to the anode of Zener diode 30. The cathodes of Zener diodes 30 and 33 are respectively connected to bases 24 and 25 of transistors $Q_1$ and $Q_2$.

Base 24 is also connected through resistor 34 to a gated, unilateral current conductive device, as at anode 35 of controlled rectifier CR–1. Base 25 is likewise connected through resistor 36 to anode 37 of controlled rectifier CR–2.

Generally, a controlled rectifier has an anode, cathode and gate lead and is characterized in that when reverse-biased, it blocks anode-cathode conduction in substantially the same manner as an ordinary rectifier, but when forward-biased within limits, also blocks conduction until a comparatively small trigger signal is applied to the gate lead. The controlled rectifier will then conduct in the forward direction much as an ordinary rectifier, and cessation of the gate signal will not substantially affect forward conduction. The latter ceases when the current flow is interrupted and will not be renewed upon reapplication of a forward bias until a trigger signal once again reactivates i.e. "enables" the gate. Examples of such controlled rectifier are, of course, the well-known solid-state silicon controlled rectifier as is described in Controlled Rectifier Manual, First Edition, General Electric Company, Auburn, New York, 1960, and in some configurations of the present invention, the well-known thyratron tube.

Cathodes 38 and 39 respectively of controlled rectifiers CR–1 and CR–2 are connected to one another and thence through parallel combination of resistor 40 and diode 41 to terminal 42, the latter being adapted to have coupled thereat a source of potential +V2 (typically +15 v.). Diode 41 is poled with its anode connected to the cathodes of controlled rectifiers CR–1 and CR–2.

Gate lead 43 of conttrolled rectifier CR–1 is connected to a current signal source comprising resistor 44 connected to terminal A. Similarly, gate lead 45 of controlled rectifier is connected to a current signal source comprising resistor 46 connected to terminal $\bar{A}$. Both terminals A and $\bar{A}$ are adapted to have impressed thereon signal voltages representative, for example, of a binary code.

A pair of diodes 47 and 48 are connected cathode-to-cathodes, and are respectively connected at their anodes to the anodes of corresponding controlled rectifiers CR–1 and CR–2.

It will be remembered that controlled rectifiers CR–1 and CR–2 are used to select the odd or even state of tube 20. As means for selectively controlling the biasing of controlled rectifiers CR–1 and CR–2 there is provided switching transistor $Q_3$. The cathodes of diodes 47 and 48 are also both connected to collector 49 of switching transistor $Q_3$. Emitter 50 of the latter is connected to ground, to cathodes 38 and 39 through resistor 51 and through resistor 52 to base 53 of transistor $Q_3$. Base 53 is coupled through resistor 54 to trigger input terminal 55, and, as through capacitor 56, to collector 49. If the input signal at terminal 55 is intended to be an AC pulse, an input coupling capacitor is desirable, but is not shown for the sake of clarity.

In describing the operation of the embodiment shown, it may be assumed that the appropriate values of voltages $V_1$ and $V_2$, for example, 200 and 15 volts respectively, are present at the proper terminals and that an odd decimal number is on display by tube 20. Thus, one of the controlled rectifier, for example, CR–1 is in conduction and the other controlled rectifier is then non-conductive; such situation subsists regardless of the presence of or change amongst either "enabling" or "disabling" voltage signals at the respective gate leads.

A single, preferably rectangular input command pulse is now applied at trigger terminal 55. As the pulse voltage rises toward its plateau level, transistor $Q_3$ being to conduct and is driven into saturation. The voltage at collector 49 then goes toward ground at a rate determined by the time constant of the discharge of capacitor 56. This imposes a forward-bias on both diodes 47 and 48 and they both now conduct, pulling the bases of transistors $Q_1$ and $Q_2$ down and driving them into their non-conductive states. This drops the voltages of each of anodes 21 and 22 below the extinguishing voltage of biquinary gas discharge tube 20 and thus turns off the display provided by tube 20.

The current flow from terminal 23 through, on one hand resistors 26 and 34 and diode 47, and on the other hand resistors 27 and 36 and diode 48, drops the potential at anodes 35 and 37. The voltage at cathodes 38 and 39, established primarily by the voltage-divider action of resistors 40 and 51 across the potential $+V_2$ to ground, remains substantially unaffected by the conduction of transistor $Q_3$. Rectifier CR–2, by definition originally in a non-conductive state, remains in that condition; however, the reduction of voltage on anode 35, due to the conduction of diode 47, is sufficient to reverse-bias rectifier CR–1 so that it too becomes non-conductive.

As long as the input pulse persists at a level which keeps transistor $Q_3$ in saturation, tube 20 will thus remain off, and changes in the state of the input signal levels to the gate leads of the controlled rectifiers will have no affect on tube 20.

However, as the input pulse at terminal 55 falls, at a rate set by the time constant of capacitor 56, to its original state after a predetermined duration (for example, from 50 to 500 $\mu$sec.) transistor $Q_3$ will be driven toward non-conduction and its collector potential begins to rise as current flow through diodes 47 and 48 is reduced. When capacitor 56 reaches its full charge, current flow through diodes 47 and 48 is cut off. The potential on anodes 35 and 37 will also rise at this time until the controlled rectifiers are again forward-biased or conditioned.

At this point, one of gate leads 43 and 45 is at an "enabling" voltage (i.e. a potential at a predetermined increment above the cathode voltage of a forward-biased controlled rectifier) according as which of terminals A or $\bar{A}$ is enabled by the output of an appropriate bistable device in the input counter. The other gate lead of course is not "enabled' inasmuch as its voltage is below the firing level at the corresponding cathode. Thus, if for example an even numeral is now to be displayed on tube 20, only gate lead 45 is "enabled" and triggers rectifier CR–2 into conduction. The current flow through rectifier CR–2 by-passes resistor 40 and occurs through diode 41 thus raising the potential at cathode 39 to higher than the enabling voltage. Rectifier CR–2 is thus clamped in its conductive state, and subsequent alternation of the voltage states at terminals A and $\bar{A}$ will not affect the conductive states of the controlled rectifiers until another command pulse again turns on transistor $Q_3$.

Conduction of current through controlled rectifier CR–2 tends to hold the voltage on base 25 at the same level as during the occurrence of conduction through diodes 48 and 47, hence holding "off" transistor $Q_2$. However, the base voltage on transistor $Q_1$ is not so held, so rises and drives transistor $Q_1$ into its normally conductive state. This allows the potential at anode 22 to rise to the firing point of tube 20 (e.g. about 140 volts) where current flow between anode 21 and a selected one of the five cathodes of the tube can occur. The subsequent current flow through tube 20 is largely limited by the action of Zener diode 30 and resistor 28 (similar limitation being applied by Zener diode 33 and resistor 31 for the display of odd-numbered numerals).

While the invention has been described in connection with the embodiment shown, it is to be understood that the principles of the invention are of considerably wider scope. For example, it will be appreciated that, under certain circumstances, other gated rectifier devices such as thyratrons can be employed as rectifier CR–1 and CR–2. Nor is the invention to be considered limited to use with biquinary tubes or indeed gaseous discharge display devices. Other gaseous discharge devices such as simple neon tubes and even electromechanical displays can be driven with a circuit embodying the present invention.

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:

1. A storage display control circuit for energizing and deenergizing upon command, storage display means having first and second display portions for displaying indicia corresponding to coded electrical signals, said circuit comprising;

first gated, unilateral current-conductive means having a gate lead, and an anode and cathode connected for controlling current conduction to activate and deactivate said first display portion;

second gated, unilateral current-conductive means having a gate lead and an anode and a cathode connected for controlling current conduction to activate and deactivate said second display portion;

means for coupling a source of normal first bias of one polarity to both said current conductive means;

switch means responsive to the leading edge of a command pulse for connecting a source of sufficient second bias of opposite polarity to both said current conductive means so as to overcome said first bias and drive the latter means into a state wherein both display portions are deactivated;

said switch means being responsive to said pulse for substantially the duration thereof for maintaining said second bias on both said current conductive means;

said switch means being responsive to the trailing edge of said pulse for removing said second bias from both said current conductive means;

all of said means being connected so that upon removal of said second bias said normal first bias permits only that current-conductive means having its gate lead energized at a predetermined level by one of said electrical signals to be triggered thereby into a state wherein only one of said display portions is responsively activated.

2. A storage display control circuit for energizing and deenergizing upon command, a storage display device having normally activated first and second display portions for displaying indicia corresponding to coded electrical signals, said circuit comprising;

a first controled rectifier having a gate lead, and an anode and cathode connected for controlling current conduction to deactivate said normally activated first display portion;

a second controlled rectifier having a gate lead, and an anode and a cathode connected for controlling current conduction to deactivate said normally activated second display portion;

means for coupling a source of normal first bias of one polarity to both said controlled rectifiers;

switch means responsive to the leading edge of a command pulse for connecting a source of second bias of opposite polarity to both said rectifiers sufficient to overcome said first bias and drive both said rectifiers into a state wherein both said display portions are deactivated;

said switch means being responsive to said pulse for substantially the duration thereof for maintaining said second bias on both said controlled rectifiers;

said switch means being responsive to the trailing edge of said pulse for removing said second bias from both said rectifiers;

all of said means and rectifiers being connected so that upon removal of said second bias said normal first bias permits that rectifier having its gate lead energized at a predetermined level by one of said electrical signals to be thereby triggered into a state wherein only one of said display portions is kept deactivated and the other of said display portions is allowed to return to its normal activation.

3. A storage display control circuit for energizing and deenergizing upon command, a storage display device having normally activated first and second display portions for displaying indicia corresponding to coded electrical signals, said circuit comprising;

a first controlled rectifier having a gate lead, and an anode and cathode connected for deactivating said first display portion when said rectifier is in a non-conductive state;

a second controlled rectifier having a gate lead, and an anode and a cathode connected for deactivating said second display portion when said second rectifier is in a non-conductive state;

means for coupling a source of potential to said rectifiers for normally forward-biasing both said controlled rectifiers;

switch means responsive to the leading edge of a command pulse for connecting a source of potential to both said rectifiers sufficient to overcome said forward bias and reverse bias both said rectifiers into their non-conductive state;

said switch means being responsive to said pulse for substantially the duration thereof for maintaining said reverse bias;

said switch means being responsive to the trailing edge of said pulse for removing said reverse bias;

all of said means and rectifiers being connected so that upon removal of said reverse bias said normal forward-bias permits that rectifier having its gate lead energized at a predetermined level by one of said electrical signals to be triggered into a conductive state.

4. A storage display control circuit for energizing and deenergizing upon command, storage display means having first and second display portions for displaying indicia corresponding to coded electrical signals, said circuit comprising;

a first controlled rectifier having an anode, cathode, and gate lead;

a second controlled rectifier having an anode, cathode and gate lead;

the cathodes of said rectifiers being connected directly to one another;

a pair of diodes having their respective anodes connected to corresponding anodes of said rectifiers, and having their cathodes connected to one another;

means for enabling selectively only one of said gate leads at a time in accordance with said electrical signals;

means for normally forward biasing the anode-cathode circuit of each of said rectifiers such that only the one rectifier having its gate lead enabled can be triggered into conduction;

first switch means responsive to the leading edge of an input command pulse for connecting said diode cathodes to ground so as thereby to overcome said forward bias and impose a reverse bias on said rectifiers;

normally-conductive second switch means connected to said first display portion and responsive to conduction through said diodes and said first rectifier so as to become non-conductive for deenergizing said first display portion;

normally conductive third switch means connected to said second display portion of said device and responsive to conduction through said diodes and said second rectifier so as to become non-conductive for deenergizing said second display portion;

said first switch means being responsive to the trailing edge of said pulse for disconnecting said diodes cathodes from said ground and removing said reverse bais;

whereby upon removal of said reverse bias said normal forward bias is restored thereby permitting the rectifier having an enabled gate lead to be triggered into conduction and hold the corresponding one of said second and third switch means in its non-conductive state.

5. A storage display control circuit as defined in claim 4 wherein said means for normally forward-biasing said rectifiers comprises voltage divider means having an intermediate tap connected to said rectifier cathodes, and said first switch means is a transistor connected so as to form a conductive circuit between said diode cathodes and ground responsively to said leading edge.

6. A storage display circuit for selectively controlling portions of display means comprising, in combination;

a first and second controlled rectifier each having a respective anode, cathode and gate lead;

means for connecting each of said anodes to a respective portion of said display means;

said cathodes being connected directly to one another and being connectable to means for normally imposing a forward-bias on said cathodes;

first and second diodes, a switch operable for connecting each of said anodes through a corresponding one of said diodes to a system ground for providing a potential level which constitutes a reverse-bias simultaneously on both rectifiers and for disconnecting each of said anodes from said system ground, and;

means connected to said switch for controlling the rate at which said reverse bias is imposed and removed from said rectifiers.

References Cited

UNITED STATES PATENTS

| | | | |
|---|---|---|---|
| 3,030,550 | 4/1962 | Smeltzer | 307—88.5 |
| 3,176,159 | 3/1965 | Laishley | 307—88.5 |

NEIL C. READ, *Primary Examiner.*

A. J. KASPER, *Assistant Examiner.*